US012503607B2

(12) United States Patent
Guo et al.

(10) Patent No.: US 12,503,607 B2
(45) Date of Patent: Dec. 23, 2025

(54) MODIFIED CARBON BLACK AND PRODUCTION METHOD THEREFOR, RESIN COMPOSITION, AND COPPER CLAD LAMINATE

(71) Applicant: GUANGDONG HINNO-TECH CO., LTD., Jiangmen (CN)

(72) Inventors: Yongjun Guo, Jiangmen (CN); Wenyan Wen, Jiangmen (CN); Xiaolong Qi, Jiangmen (CN); Yangjie Zhu, Jiangmen (CN)

(73) Assignee: GUANGDONG HINNO-TECH CO., LTD., Jiangmen (CN)

( * ) Notice: Subject to any disclaimer, the term of this patent is extended or adjusted under 35 U.S.C. 154(b) by 1017 days.

(21) Appl. No.: 17/627,083

(22) PCT Filed: Apr. 30, 2020

(86) PCT No.: PCT/CN2020/088414
§ 371 (c)(1),
(2) Date: Jan. 13, 2022

(87) PCT Pub. No.: WO2021/109442
PCT Pub. Date: Jun. 10, 2021

(65) Prior Publication Data
US 2022/0267608 A1 Aug. 25, 2022

(30) Foreign Application Priority Data

Dec. 4, 2019 (CN) .......................... 201911226294.9

(51) Int. Cl.
| C09C 1/56 | (2006.01) |
| C08K 3/04 | (2006.01) |
| C08K 9/08 | (2006.01) |
| H05K 1/03 | (2006.01) |
| C08K 3/013 | (2018.01) |
| C08K 5/00 | (2006.01) |

(52) U.S. Cl.
CPC ................ *C09C 1/565* (2013.01); *C08K 3/04* (2013.01); *C08K 9/08* (2013.01); *H05K 1/0306* (2013.01); *C08K 3/013* (2018.01); *C08K 5/0025* (2013.01); *C08K 2201/005* (2013.01)

(58) Field of Classification Search
CPC ....................................................... C09C 1/565
See application file for complete search history.

(56) References Cited

U.S. PATENT DOCUMENTS

| 6,372,351 B1 | 4/2002 | Takemiya et al. |
| 7,641,722 B2 | 1/2010 | Lee et al. |
| 8,226,761 B2 | 7/2012 | Sujeeth et al. |
| 2010/0283174 A1 | 11/2010 | Ma et al. |
| 2018/0037760 A1 | 2/2018 | Kirino et al. |

FOREIGN PATENT DOCUMENTS

| CN | 1408778 A | 4/2003 |
| CN | 104527177 A | 4/2015 |
| CN | 105461988 A | 4/2016 |
| CN | 106634059 A | 5/2017 |
| CN | 108749240 A | 11/2018 |
| CN | 109563343 A | 4/2019 |
| CN | 110305445 A | 10/2019 |
| CN | 111057270 A | 4/2020 |
| JP | 2004211100 A | 7/2004 |
| JP | 2004536945 A | 12/2004 |
| JP | 2006213922 A | 8/2006 |
| JP | 2010537006 A | 12/2010 |
| JP | 2016183244 A | 10/2016 |
| JP | 2019006981 A | 1/2019 |
| TW | 593574 B | 6/2004 |
| TW | I605096 B | 11/2017 |
| WO | 03011982 A1 | 2/2003 |

OTHER PUBLICATIONS

Japanese Office Action, and English Translation thereof, for Japanese Counterpart Application No. 2022-502505, mailed Feb. 28, 2023 (7 pages).
Korean Request for the Submission of an Opinion, and English Translation therefore, for counterpart Korean Application No. 10-2022-7018460, mailed Apr. 29, 2024 (15 pages).
International Search Report and Written Opinion, and English Translation thereof, for International Application No. PCT/CN2020/088414, mailed Aug. 13, 2020 (7 pages).
Chinese Office Action for counterpart Chinese Application No. 201911226294.9, mailed Dec. 24, 2020 (8 pages).
Chinese Office Action for counterpart Chinese Application No. 201911226294.9, mailed Apr. 22, 2021 (8 pages).
Taiwan Office Action for counterpart Taiwan Application No. 11020257290, mailed Mar. 19, 2021 (6 pages).
Taiwan Office Action for counterpart Taiwan Application No. 11020950950, mailed Sep. 29, 2021 (9 pages).

(Continued)

*Primary Examiner* — Stuart L Hendrickson
(74) *Attorney, Agent, or Firm* — Kagan Binder, PLLC

(57) ABSTRACT

The present invention relates to modified carbon black and a production method therefor, a resin composition and copper clad laminate. The modified carbon black comprises carbon black and a modified group; the surface of the carbon black has an acyl chloride group; the modified group is formed by a modified macromolecule and the acyl chloride group undergoing a grafting reaction; and the modified macromolecule is an alcohol macromolecule.

7 Claims, No Drawings

(56) References Cited

OTHER PUBLICATIONS

Fu et al., "Research of in Situ Grafted Carbon Black," Applied Mechanics and Materials, vol. 464, pp. 41-43, 2014, (4 pages).

Yi-tao et al., "Synthesis of Chloro-Terminated Polyethylene Glycol via Reaction of Polyethylene Glycol and Thionyl Chloride," Journal of Chemical Engineering of Chinese Universities, vol. 31, No. 6, 2017, (7 pages). (English Translation of Abstract only. See Search Report in Chinese Office Action for 201911226294.9 Dec. 24, 2020).

Xingyue et al., "Experiment 6 Preparation of Nylon 610 by Interfacial Polymerization," Applied Chemistry Specialty Experiment, ISBN 978-7-5643-4665-2, p. 137, Apr. 30, 2016. (4 pages). (English Translation of Abstract only. See Search Report in Chinese Office Action for 201911226294.9 Apr. 22, 2021).

MODIFIED CARBON BLACK AND PRODUCTION METHOD THEREFOR, RESIN COMPOSITION, AND COPPER CLAD LAMINATE

TECHNICAL FIELD

The present disclosure relates to a field of material technology, in particular to a modified carbon black and a preparation method thereof, a resin composition, and a copper clad laminate.

BACKGROUND

In recent years, due to the outstanding characteristics of low energy consumption and high efficiency of Light-Emitting Diodes (LEDs), it has been widely used in the fields of electrical instructions, high-definition LED displays, LED backlights, landscape lighting, interior decoration and others. Due to the rapid development of LEDs, the development of functional copper clad laminates has also been promoted. The reason why it is called functional copper clad laminate is because the copper clad laminate used for LED needs to have the insulation and other properties of ordinary copper clad laminate, but also need to have good light-shielding function, so as to avoid the light of LED light source passes through the back of the board as much as possible, and absorb natural light from outside well, thereby improving the clarity and resolution of the LED display.

In order to give the copper clad laminate with a light-shielding property, currently, the carbon black is often added to the copper-clad laminate in the industry to give the board a black function, thereby achieving the purpose of light-shielding. However, due to the small particle size, large specific surface area, and easy agglomeration of carbon black particles, it is difficult to stably disperse in various media. At the same time, a carbon black has electrical conductivity and will easily affects the insulation performance of the material. These defects limit the full performance of the carbon black.

CN201010177757 uses a small amount of carbon black powder to make the resin composition black and thus having a light-shielding effect, and used titanium dioxide to enhance the light-shielding effect, to obtain a black covering film, but the direct addition of carbon black powder will cause the insulation performance of the material to decline.

CN201310425929 greatly reduces the light transmittance of the prepared copper foil-clad substrate by adding graphene or graphene oxide coated inorganic fillers, without reducing the insulation of the prepared copper foil-clad substrate, but the graphene has a relatively high price and high cost.

SUMMARY

Accordingly, the present disclosure provides a modified carbon black, which provides the copper clad laminate with good light-shielding property while not affecting the insulating property, and has good dispersion and low cost.

A modified carbon black includes a carbon black; and a modified group;
a surface of the carbon black has an acyl chloride group, the modified group is formed by reacting and grafting a modified polymer with the acyl chloride group, and the modified polymer is an alcohol polymer.

In one embodiment, the carbon black has a particle size of 5 nm to 100 nm.

In one embodiment, the carbon black has a particle size of 5 nm to 50 nm.

The present disclosure further provides a method of preparing the modified carbon black, which includes the following steps:
(1) performing a surface oxidation modification to a carbon black by a liquid phase method, then performing an acylating chlorination to form an acyl chloride group on the surface of the carbon black; and
(2) mixing the carbon black with the acyl chloride group formed on the surface thereof and a modified polymer, and performing a grafting reaction to form a modified group; wherein the modified polymer is an alcohol polymer.

In one embodiment, the carbon black has a particle size of 5 nm to 100 nm.

In one embodiment, the carbon black has a particle size of 5 nm to 50 nm.

In one embodiment, in step (1), the surface oxidation modification includes the following step:
mixing an oxidant and the carbon black, reacting at 20° C. to 30° C., then washing an obtained solid with water and drying.

In one embodiment, the oxidant is any one of nitric acid, hydrogen peroxide and ammonium persulfate.

In one embodiment, when the oxidant is nitric acid, the reaction time is 1.5 h to 2.5 h;
when the oxidant is hydrogen peroxide, the reaction time is 95 h to 97 h;
when the oxidant is ammonium persulfate, the reaction time is 23 h to 25 h.

In one embodiment, in the step (1), a method of the acylating chlorination is: mixing the carbon black after the surface oxidation modification with a thionyl chloride in a solvent, and reacting at 35° C. to 45° C. for 8 h to 12 h.

In one embodiment, in the step (2), the grafting reaction comprises the following step:
mixing the carbon black with the acyl chloride group formed on the surface thereof and the modified polymer in a solvent, and reacting at 50° C. to 90° C. for 10 h to 30 h.

The present disclosure further provides a resin composition, comprising the modified carbon black described above or the modified carbon black prepared by the preparation method described above.

In one embodiment, the resin composition, in percentage by weight, is prepared from raw materials comprising the following components:

| | |
|---|---|
| modified carbon black | 0.1%~10%; |
| functional resin | 30%~70%; |
| curing agent | 2%~30%; |
| filler | 20%~60%; |
| coupling agent | 0.1%~2%; and |
| curing accelerator | 0.1%~2%. |

The present disclosure further provides a copper clad laminate using the resin composition described above as a sizing material.

Compared with the conventional solution, the present disclosure has the following beneficial effects:

The modified carbon black of the present disclosure includes a modified group by grafting an acyl chloride group on the surface of the modified carbon black with a modified polymer, wherein the modified polymer is an alcohol polymer, which can enable the modified carbon black to have excellent insulation, while the Van der Waals' force between particles is small, and thus can be stably dispersed in media. The copper clad laminate prepared by the modified carbon black has both excellent insulation and light-shielding properties, and has low preparation cost.

DETAILED DESCRIPTION OF THE EMBODIMENTS

The present disclosure will be further described in detail below with reference to specific examples. The present disclosure may be embodied in many different forms and is not limited to the embodiments described herein. Rather, these embodiments are provided so that the understanding of the disclosure of the present invention will be more thorough and complete.

Unless otherwise defined, all technical and scientific terms used herein have the same meaning as commonly understood by skilled person in the art to which the present disclosure belongs. The terms used in the specification of the present disclosure herein are for the purpose of describing specific embodiments only and are not intended to limit the present disclosure.

The embodiment of the present disclosure provides a modified carbon black, which includes a carbon black and a modified group;

the surface of the carbon black has an acyl chloride group, the modified group is formed by reacting and grafting a modified polymer with the acyl chloride group, and the modified polymer is an alcohol polymer.

In one specific embodiment, the alcohol polymer is polyethylene glycol or polypropylene glycol.

In one specific embodiment, the carbon black has a particle size of 5 nm to 100 nm. Preferably, the carbon black has a particle size of 5 nm to 50 nm. Using a carbon black within such particle size range can provide more excellent light-shielding property.

The embodiment of the present disclosure further provides a method of preparing the modified carbon black, which includes the following steps:

(1) performing a surface oxidation modification of to a carbon black by a liquid phase method, then performing an acylating chlorination to form an acyl chloride group on the surface of the carbon black; and (2) mixing the carbon black with the acyl chloride group formed on the surface thereof and a modified polymer, and performing a grafting reaction to form a modified group; wherein the modified polymer is an alcohol polymer.

It should be understood that when reacting with alcohol polymer, the acyl chloride group reacts with alcohols to form esters and hydrogen chloride.

In one specific embodiment, in step (1), the surface oxidation modification includes the following step: mixing an oxidant and the carbon black, reacting at 20° C. to 30° C., then washing an obtained solid with water and drying.

In one specific embodiment, the oxidant is any one of nitric acid, hydrogen peroxide and ammonium persulfate. Specifically, the hydrogen peroxide may be a hydrogen peroxide aqueous solution with a mass concentration of 0.3% to 1.0%, and the ammonium persulfate may be a saturated ammonium persulfate solution.

In one specific embodiment, when the oxidant is nitric acid, the reaction time is 1.5 h to 2.5 h; when the oxidant is hydrogen peroxide, the reaction time is 95 h to 97 h; when the oxidant is ammonium persulfate, the reaction time is 23 h to 25 h. By reasonably controlling the oxidation time, the carbon black and the oxidant can be fully reacted, the content of oxygen-containing groups on the surface of the modified carbon black is significantly increased, and the oxidant will not leave other substances in the modified carbon black.

In one specific embodiment, the drying method is: drying under a vacuum condition with a pressure of 0.2 kPa to 0.4 kPa at a temperature of 110° C. to 130° C.

In one specific embodiment, in step (1), a method of the acylating chlorination is: mixing the carbon black after the surface oxidation modification with a thionyl chloride in a solvent, and reacting at 35° C. to 45° C. for 8 h to 12 h.

In one specific embodiment, the solvent is dichloroethane.

In one specific embodiment, after the reaction is completed, a post-treatment is performed, which includes: first, evaporating the solvent under reduced pressure, then raising the temperature to 50° C., and then vacuumizing to remove the remaining thionyl chloride.

In one embodiment, in step (2), the grafting reaction includes the following step:

mixing the carbon black with the acyl chloride group formed on the surface thereof and the modified polymer in a solvent, and reacting at 50° C. to 90° C. for 10 h to 30 h.

In one specific embodiment, the solvent is dichloroethane.

In one specific embodiment, after the reaction is completed, a post-treatment is performed, which includes: washing the obtained solid with water, and drying at 100° C. to 120° C. for 22 h to 25 h.

The embodiment of present disclosure further provides a resin composition, which includes the aforementioned modified carbon black, or the modified carbon black prepared by the aforementioned preparation method.

In one embodiment, the resin composition, in percentage by weight, is prepared from raw materials including the following components:

| | |
|---|---|
| modified carbon black | 0.1%~10%; |
| functional resin | 30%~70%; |
| curing agent | 2%~30%; |
| filler | 20%~60%; |
| coupling agent | 0.1%~2%; and |
| curing accelerator | 0.1%~2%. |

Specifically, the functional resin is epoxy resin, which includes but not limited to, cycloaliphatic epoxy resin, bisphenol A epoxy resin, o-cresol formaldehyde epoxy resin, phosphorus-containing epoxy resin, Phenol phenolic epoxy resin, biphenyl epoxy resin, naphthalene ring epoxy resin, etc. Bismaleimide includes but not limited to, diphenylmethane bismaleimide, N'-m-phenylene bismaleimide, polyamine bismaleimide, etc. Benzoxazine includes but not limited to, bisphenol A benzoxazine, MDA benzoxazine, phenol benzoxazine, DCPD benzoxazine, etc.

Specifically, the curing agent includes, but not limited to, cyanate ester curing agent, aliphatic polyamine curing agent, alicyclic polyamine curing agent, aromatic amine curing agent, polyamide curing agent, latent curing agent, Lewis acid-amine complex curing agent, acid anhydride curing agent, phenolic curing agent, etc.

Specifically, the filler includes, but not limited to, titanium dioxide, silicon dioxide, magnesium oxide, magnesium hydroxide, talc, mica powder, aluminum oxide, silicon carbide, boron nitride, aluminum nitride, molybdenum oxide, barium sulfate, and the like.

Specifically, the coupling agent includes, but not limited to, a silane coupling agent, a titanate coupling agent, an aluminate coupling agent, an organic chromium complex coupling agent, and the like.

Specifically, the curing accelerator includes, but not limited to, an imidazole accelerator, a peroxide accelerator, an azo accelerator, a tertiary amine accelerator, a phenol accelerator, an organic metal salt accelerator, an inorganic metal salt accelerator, and the like.

The present disclosure further provides a copper clad laminate using the resin composition described above as a sizing material.

The following are specific examples, and the raw materials used are all commercially available products unless otherwise specified.

The carbon black used in the examples has a particle size of 5 nm to 50 nm.

Preparation of Modified Carbon Black 1

(1) 100 ml of nitric acid and 10 g of carbon black were mixed and reacted at 25° C. for 2 h. After the reaction was completed, it was filtered and washed with deionized water until the pH value of the cleaning solution was constant. The carbon black was dried in a vacuum oven at a temperature of 120° C. and a pressure of 0.3 kPa until the mass was constant, it was sealed and dried and stored to obtain the surface oxidized carbon black.

(2) 10 g of the surface oxidized carbon black, 6 ml of thionyl chloride, and 200 ml of dichloroethane were added to a three-necked flask, heated to 40° C. and stirred to react for 10 h. After the reaction was completed, the dichloroethane was evaporated under reduced pressure. Then, the remaining material was heated to 50° C., and vacuumized to remove the remaining thionyl chloride, to obtain surface acyl chloride activated carbon black.

(3) 5 g of activated carbon black, 3 g of polyethylene glycol, and 200 ml of dichloroethane were added to a three-necked flask and stirred, and reacted at 50° C. for 30 h. After the reaction was completed, the dichloroethane solvent was evaporated under reduced pressure, and grafted carbon black was repeatedly washed with deionized water and then dried at 110° C. for 24 h.

Preparation of Modified Carbon Black 2

(1) 100 ml of saturated ammonium persulfate solution and 10 g of carbon black were mixed and reacted at 25° C. for 24 h. After the reaction was completed, it was filtered and washed with deionized water until the pH value of the cleaning solution was constant. The carbon black was dried in a vacuum oven at a temperature of 120° C. and a pressure of 0.3 kPa until the mass was constant, it was sealed and dried and stored to obtain the surface oxidized carbon black.

(2) 10 g of the surface oxidized carbon black, 6 ml of thionyl chloride, and 200 ml of dichloroethane were added to a three-necked flask, heated to 40° C. and stirred to react for 10 h. After the reaction was completed, the dichloroethane was evaporated under reduced pressure. Then, the remaining material was heated to 50° C., and vacuumized to remove the remaining thionyl chloride, to obtain surface acyl chloride activated carbon black.

(3) 5 g of activated carbon black, 3 g of polyethylene glycol and 200 ml, of dichloroethane were added to a three-necked flask and stirred, and reacted at 90° C. for 10 h. After the reaction was completed, the dichloroethane solvent was evaporated under reduced pressure, and grafted carbon black was repeatedly washed with deionized water and then dried at 110° C. for 24 h.

Preparation of Modified Carbon Black 3

(1) 100 ml of hydrogen peroxide solution and 10 g of carbon black were mixed and reacted at 25° C. for 96 h. After the reaction was completed, it was filtered and washed with deionized water until the pH value of the cleaning solution was constant. The carbon black was dried in a vacuum oven at a temperature of 120° C. and a pressure of 0.3 kPa until the mass was constant, it was sealed and dried and stored to obtain the surface oxidized carbon black.

(2) 10 g of the surface oxidized carbon black, 6 ml of thionyl chloride, and 200 ml of dichloroethane were added to a three-necked flask, heated to 40° C. and stirred to react for 10 h. After the reaction was completed, the dichloroethane was evaporated under reduced pressure. Then, the remaining material was heated to 50° C., and vacuumized to remove the remaining thionyl chloride, to obtain surface acyl chloride activated carbon black.

(3) 5 g of activated carbon black, 3 g of polyethylene glycol, and 200 ml of dichloroethane were added to a three-necked flask and stirred, and reacted at 70° C. for 20 h. After the reaction was completed, the dichloroethane solvent was evaporated under reduced pressure, and grafted carbon black was repeatedly washed with deionized water and then dried at 110° C. for 24 h.

Example 1

5 parts of modified carbon black 1, 70 parts of bisphenol A epoxy resin, and 30 parts of phenolic curing agent were sequentially dissolved in a mixed solvent of butanone, toluene, propylene glycol methyl ether with a mass ratio of 1:1:1, then 25 parts of alumina, 35 parts of silicon dioxide, 2 parts of silane coupling agent and 2 parts of 2-methylimidazole were added under a stirring condition, and then evenly stirring was continued to prepare a glue solution.

2116 glass fiber cloth (net weight of 105 g/m2) was impregnated into the glue solution and baked in a hot air circulating oven at 180° C. for 3 min to obtain a prepreg with a resin content of 55%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Example 2

5 parts of modified carbon black 1, 30 parts of benzoxazine resin, and 2 parts of phenolic curing agent were sequentially dissolved in a mixed solvent of butanone, toluene, propylene glycol methyl ether with a mass ratio of 1:1:1, then 10 parts of alumina, 10 parts of silicon dioxide, 0.1 parts of silane coupling agent and 0.1 parts of 2-methylimidazole were added under a stirring condition, and then evenly stirring was continued to prepare a glue solution.

2116 glass fiber cloth (net weight of 105 g/m$^2$) into impregnated into the glue solution and baked in a hot air circulating oven at 180° C. for 3 min to obtain a prepreg with a resin content of 45%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Example 3

0.1 parts of modified carbon black 1, 50 parts of bisphenol A epoxy resin, and 15 parts of phenolic curing agent were sequentially dissolved in a mixed solvent of butanone, toluene, propylene glycol methyl ether with a mass ratio of 1:1:1, then 25 parts of alumina, 15 parts of silicon dioxide, 1 parts of silane coupling agent and 1 parts of 2-methylimidazole were added under a stirring condition, and then evenly stirring was continued to prepare a glue solution.

2116 glass fiber cloth (net weight of 105 g/m$^2$) was impregnated into the glue solution and baked in a hot air circulating oven at 180° C. for 3 min to obtain a prepreg with a resin content of 50%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Example 4

10 parts of modified carbon black 1, 70 parts of bisphenol A epoxy resin, and 30 parts of phenolic curing agent were sequentially dissolved in a mixed solvent of butanone, toluene, propylene glycol methyl ether with a mass ratio of 1:1:1, then 25 parts of alumina, 35 parts of silicon dioxide, 2 parts of silane coupling agent and 2 parts of 2-methylimidazole were added under a stirring condition, and then evenly stirring was continued to prepare a glue solution.

2116 glass fiber cloth (net weight of 105 g/m$^2$) was impregnated into the glue solution and baked in a hot air circulating oven at 180° C. for 3 min to obtain a prepreg with a resin content of 55%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Example 5

5 parts of modified carbon black 2, 70 parts of bisphenol A epoxy resin, and 30 parts of phenolic curing agent were sequentially dissolved in a mixed solvent of butanone, toluene, propylene glycol methyl ether with a mass ratio of 1:1:1, then 25 parts of alumina, 35 parts of silicon dioxide, 2 parts of silane coupling agent and 2 parts of 2-methylimidazole were added under a stirring condition, and then evenly stirring was continued to prepare a glue solution.

2116 glass fiber cloth (net weight of 105 g/m$^2$) was impregnated into the glue solution and baked in a hot air circulating oven at 180° C. for 3 min to obtain a prepreg with a resin content of 55%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Example 6

5 parts of modified carbon black 3, 70 parts of bisphenol A epoxy resin, and 30 parts of phenolic curing agent were sequentially dissolved in a mixed solvent of butanone, toluene, propylene glycol methyl ether with a mass ratio of 1:1:1, then 25 parts of alumina, 35 parts of silicon dioxide, 2 parts of silane coupling agent and 2 parts of 2-methylimidazole were added under a stirring condition, and then evenly stirring was continued to prepare a glue solution.

2116 glass fiber cloth (net weight of 105 g/m$^2$) was impregnated into the glue solution and baked in a hot air circulating oven at 180° C. for 3 min to obtain a prepreg with a resin content of 55%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Comparative Example 1

5 parts of unmodified carbon black, 70 parts of bisphenol A epoxy resin, and 30 parts of phenolic curing agent were sequentially dissolved in a mixed solvent of butanone, toluene, propylene glycol methyl ether with a mass ratio of 1:1:1, then 25 parts of alumina, 35 parts of silicon dioxide, 2 parts of silane coupling agent and 2 parts of 2-methylimidazole were added under a stirring condition, and then evenly stirring was continued to prepare a glue solution.

2116 glass fiber cloth (net weight of 105 g/m$^2$) was impregnated into the glue solution and baked in a hot air circulating oven at 180° C. for 3 min to obtain a prepreg with a resin content of 55%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Comparative Example 2

5 parts of comparative modified carbon black (the raw materials and preparation method thereof were the same as in Example 1, except that polyacrylic acid was used as the modified polymer), 70 parts of bisphenol A epoxy resin, and 30 parts of phenolic curing agent were sequentially dissolved in a mixed solvent of butanone, toluene, propylene glycol methyl ether with a mass ratio of 1:1:1, then 25 parts of alumina, 35 parts of silicon dioxide, 2 parts of silane coupling agent and 2 parts of 2-methylimidazole were added under a stirring condition, and then evenly stirring was continued to prepare a glue solution.

2116 glass fiber cloth (net weight of 105 g/m2) was impregnated into the glue solution and baked in a hot air circulating oven at 180° C. for 3 min to obtain a prepreg with a resin content of 55%. 4 sheets of prepreg were laminated, and an electrolytic copper foil with a thickness of 12 μm was covered on each of the upper and lower sides of the laminated body, then the laminated body was placed in a vacuum laminator with programmable temperature and pressure controls, and then cured for 100 minutes at a pressure condition of 25 kgf/cm$^2$ and a product temperature of 200° C. in a vacuum state to produce a copper clad laminate with a thickness of 0.4 mm.

Performance tests were performed on the copper clad laminates produced in Examples 1-6 and Comparative Examples 1-2

(1) Test method:
Color: visual inspection;
Glass transition temperature (TG): tested according to IPC-TM650 2.4.25;

Light transmittance: tested with a light transmittance tester;

Volume resistance and Surface resistance: tested according to IPC-TM650 2.5.17.1;

Dispersibility: the aqueous solutions of modified carbon black and unmodified carbon black were tested for light transmittance before and after a centrifugation for 60 minutes in a centrifuge. The greater the difference in light transmittance before and after centrifugation, the more uneven the dispersion, that is, the worse the dispersion.

(2) The test results are shown in Table 1 below:

TABLE 1

| Test items | Example 1 | Example 2 | Example 3 | Example 4 | Example 5 | Example 6 | Comparative Example 1 | Comparative Example 2 |
|---|---|---|---|---|---|---|---|---|
| Color | black | black | black | black | black | black | black | black |
| TG/° C. | 150 | 200 | 155 | 150 | 150 | 150 | 145 | 150 |
| Light transmittance/% | 0 | 0 | 3 | 0 | 0 | 0 | 3 | 0 |
| Volume resistance (MΩ · cm) | $4.13 \times 10^9$ | $4.15 \times 10^9$ | $4.23 \times 10^9$ | $4.10 \times 10^9$ | $4.15 \times 10^9$ | $4.18 \times 10^9$ | $3.30 \times 10^7$ | $3.13 \times 10^8$ |
| Surface resistance (MΩ) | $5.37 \times 10^8$ | $5.39 \times 10^8$ | $5.47 \times 10^8$ | $5.32 \times 10^8$ | $5.40 \times 10^8$ | $5.33 \times 10^8$ | $4.35 \times 10^6$ | $4.37 \times 10^7$ |
| Dispersibility difference in carbon black aqueous solution/% | 20.3 | 20.5 | 20.2 | 20.1 | 20.5 | 20.8 | 86.7 | 25.1 |

Note:
the larger the value of the dispersion difference in aqueous solution, the worse the dispersion.

Each of the technical features of the above-mentioned embodiments may be combined arbitrarily. To simplify the description, not all the possible combinations of each of the technical features in the above embodiments are described. However, all of the combinations of these technical features should be considered as within the scope of this disclosure, as long as such combinations do not contradict with each other.

The above-mentioned embodiments are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. A method of preparing a modified carbon black, comprising the following steps:
   (1) performing surface oxidation modification of a carbon black by a liquid phase method, then performing an acylating chlorination to form an acyl chloride group on a surface of the carbon black, wherein the carbon black has a particle size of 5 nm to 100 nm;
   (2) reacting the acyl chloride group on the surface of the carbon black with an alcohol polymer, thereby forming a carbon black having the alcohol polymer attached thereto;
   wherein the alcohol polymer is polyethylene glycol or polypropylene glycol.

2. The method of preparing the modified carbon black according to claim 1, wherein the carbon black has a particle size of 5 nm to 50 nm.

3. The method of preparing the modified carbon black according to claim 1, wherein in step (1), the surface oxidation modification comprises the following step:
   mixing an oxidant and the carbon black, reacting at 20° C. to 30° C., then washing an obtained solid with water, and drying.

4. The method of preparing the modified carbon black according to claim 3, wherein the oxidant is any one of nitric acid, hydrogen peroxide, and ammonium persulfate.

5. The method of preparing the modified carbon black according to claim 4,
   wherein when the oxidant is nitric acid, a reaction time is 1.5 h to 2.5 h;
   when the oxidant is hydrogen peroxide, the reaction time is 95 h to 97 h;
   when the oxidant is ammonium persulfate, the reaction time is 23 h to 25 h.

6. The method of preparing the modified carbon black according to claim 1, wherein in the step (1), a method of the acylating chlorination is: mixing the carbon black after the surface oxidation modification with a thionyl chloride in a solvent, and reacting at 35° C. to 45° C. for 8 h to 12 h.

7. The method of preparing the modified carbon black according to claim 1, wherein in the step (2), the
   acyl chloride group on the surface of the carbon black is reacted with the alcohol polymer at 50° C. to 90° C. for 10 h to 30 h to form the carbon black having the alcohol polymer attached thereto.

* * * * *